United States Patent
Arimilli et al.

(10) Patent No.: US 7,904,693 B2
(45) Date of Patent: Mar. 8, 2011

(54) FULL VIRTUALIZATION OF RESOURCES ACROSS AN IP INTERCONNECT USING PAGE FRAME TABLE

(75) Inventors: Ravi K. Arimilli, Austin, TX (US); Claude Basso, Raleigh, NC (US); Jean L. Calvignac, Raleigh, NC (US); Piyush Chaudhary, Highland, NY (US); Edward J. Seminaro, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/024,773

(22) Filed: Feb. 1, 2008

(65) Prior Publication Data

US 2009/0198953 A1   Aug. 6, 2009

(51) Int. Cl.
*G06F 12/10* (2006.01)

(52) U.S. Cl. ............. 711/206; 711/6; 709/212; 709/216; 709/245

(58) Field of Classification Search .................... 711/208
See application file for complete search history.

(56) References Cited

U.S. PATENT DOCUMENTS

| | | | |
|---|---|---|---|
| 5,838,921 A | 11/1998 | Speeter | |
| 6,457,068 B1 * | 9/2002 | Nayyar et al. ..................... | 710/3 |
| 6,587,469 B1 | 7/2003 | Bragg | |
| 6,717,943 B1 | 4/2004 | Schwering | |
| 6,965,599 B1 | 11/2005 | Sakurai et al. | |
| 6,968,398 B2 * | 11/2005 | Davis et al. ....................... | 710/3 |
| 6,996,631 B1 | 2/2006 | Aiken, Jr. et al. | |
| 7,120,697 B2 | 10/2006 | Aiken, Jr. et al. | |
| 7,191,240 B1 | 3/2007 | Johnson | |
| 7,231,662 B2 | 6/2007 | Wissenbach | |
| 7,260,648 B2 | 8/2007 | Tingley et al. | |
| 7,299,266 B2 * | 11/2007 | Boyd et al. ..................... | 709/213 |
| 7,502,884 B1 | 3/2009 | Shah et al. | |
| 7,607,011 B1 | 10/2009 | Johnson et al. | |
| 2001/0037435 A1 * | 11/2001 | Van Doren ..................... | 711/153 |
| 2002/0129274 A1 * | 9/2002 | Baskey et al. .................. | 713/201 |
| 2003/0140193 A1 * | 7/2003 | Acharya et al. ................. | 711/112 |
| 2004/0044744 A1 * | 3/2004 | Grosner et al. ................. | 709/217 |
| 2004/0103225 A1 * | 5/2004 | McAlpine et al. .............. | 710/52 |
| 2004/0246991 A1 | 12/2004 | Tsuzuki et al. | |
| 2005/0010386 A1 | 1/2005 | Tharp et al. | |
| 2005/0044301 A1 | 2/2005 | Vasilevsky et al. | |

(Continued)

OTHER PUBLICATIONS

Definition of page translation; NO ePATENTS.*

(Continued)

*Primary Examiner* — Jack A Lane

(74) *Attorney, Agent, or Firm* — Stephen R. Tkacs; Stephen J. Walder, Jr.; Matthew B. Talpis

(57) ABSTRACT

An addressing model is provided where devices, including I/O devices, are addressed with internet protocol (IP) addresses, which are considered part of the virtual address space. A task, such as an application, may be assigned an effective address range, which corresponds to addresses in the virtual address space. The virtual address space is expanded to include Internet protocol addresses. Thus, the page frame tables are also modified to include entries for IP addresses and additional properties for devices and I/O. Thus, a processing element, such as an I/O adapter or even a printer, for example, may also be addressed using IP addresses without the need for library calls, device drivers, pinning memory, and so forth. This addressing model also provides full virtualization of resources across an IP interconnect, allowing a process to access an I/O device across a network.

20 Claims, 6 Drawing Sheets

U.S. PATENT DOCUMENTS

| | | | | |
|---|---|---|---|---|
| 2005/0273571 | A1* | 12/2005 | Lyon et al. | 711/203 |
| 2006/0064698 | A1 | 3/2006 | Miller et al. | |
| 2006/0070069 | A1* | 3/2006 | Aguilar et al. | 718/100 |
| 2007/0106874 | A1* | 5/2007 | Pan et al. | 711/206 |
| 2007/0230477 | A1 | 10/2007 | Worley | |
| 2009/0092137 | A1 | 4/2009 | Haigh et al. | |
| 2009/0177848 | A1* | 7/2009 | Mosek et al. | 711/154 |
| 2009/0198951 | A1 | 8/2009 | Arimilli et al. | |
| 2009/0276604 | A1* | 11/2009 | Baird et al. | 711/206 |
| 2009/0328193 | A1 | 12/2009 | Moore et al. | |

OTHER PUBLICATIONS

Virtual Distributed Environments in a Shared Infrastructure; Ruth et al.; IEEE Computer, vol. 38 No. 5; May 2005.*

Resource Virtualization Renaissance; Figueiredo et al.; IEEE Computer, vol. 38 No. 5; May 2005.*

The POWER4 Processor Introduction and Tuning Guide; Behling et al.; IBM; Nov. 2001.*

Buddhikot, Milind et al., "MobileNAT: A New Technique for Mobility Across Heterogeneous Address Spaces", WMASH'03, San Diego, California, Sep. 19, 2003, pp. 75-84.

Buddhikot, Milind et al., "MobileNAT: A New Technique for Mobility Across Heterogeneous Address Spaces", ACM MONET Journal, vol. 10, No. 3, Mar. 2005, pp. 289-302.

USPTO U.S. Appl. No. 12/024,744, Image File Wrapper printed Sep. 8, 2010, 1 page.

Behling, Steve et al., "The POWER4 Processor Introduction and Tuning Guide", IBM, Nov. 2001, 212 pages.

Figueiredo, Renato et al., "Resource Virtualization Renaissance", IEEE Computer, vol. 38, No. 5, May 2005, pp. 28-31.

Ruth, Paul et al., "Virtual Distributed Environments in a Shared Infrastructure", IEEE Computer Society, vol. 38, No. 5, May 2005, pp. 63-69.

* cited by examiner

FULL VIRTUALIZATION OF RESOURCES ACROSS AN IP INTERCONNECT USING PAGE FRAME TABLE

This invention was made with United States Government support under Agreement No. HR0011-07-9-0002 awarded by DARPA. THE GOVERNMENT HAS CERTAIN RIGHTS IN THE INVENTION.

BACKGROUND

1. Technical Field

The present application relates generally to an improved data processing system and method. More specifically, the present application is directed to heterogeneous processing elements.

2. Description of Related Art

Input/output, or I/O, refers to the transfer of data between a processor and a peripheral device in a data processing system. Every transfer is an output from one device and an input to another device. FIG. 1 is a block diagram illustrating a typical multiple processor data processing system. In the depicted example, data processing system 100 has a plurality of processors 102, 104 connected via a symmetric multiprocessing (SMP) bus 120. Memory controller (MC) 132 and input/output channel controller (IOCC) 134 also connect to SMP bus 120

In the example shown in FIG. 1, IOCC 134 connects to a plurality of expansion slots, such as peripheral component interconnect express (PCI Express or PCIe) slots 136. One or more I/O adapter 138 may connect to PCI Express slots 136.

FIG. 2 illustrates a typical software environment for a data processing system, such as data processing system 100 in FIG. 1. A plurality of tasks 1-N 202, 204, 206 run under control of operating system 220. A task 202, 204, 206 may be a process running on a processor, for example. Each task has an assigned address space. For example, operating system 220 assigns task 1 202 an address space 212 that comprises a range of effective addresses, which may also be referred to as virtual addresses. Each task 202, 204, 206 has an address space, or address spaces, from which and to which it may read and write. The operating system 220 translates the effective addresses to real addresses, which may exist in memory or may be expanded to persistent storage using a virtual memory manager.

Each time a task, such as task 2 204, attempts to access an I/O device, such as I/O adapter 138 in FIG. 1, task 204 must make a call to one of libraries 222, 224, 226. There are three main categories of I/O, including classic I/O, storage, and network I/O. Thus, these libraries may include a classic I/O library, a storage library, and a network library, for example. For instance, task 2 204 may access, or "touch," an I/O adapter by making a call to library 222. Each library may include sub-calls. For example, the network I/O library, such as library 222, may include transmission control protocol/Internet protocol (TCP/IP) calls, user datagram protocol/Internet protocol (UDP/IP) calls, etc.

FIG. 3 illustrates a typical input/output access. A task makes a call to library 310, which accesses device driver 320 for the target I/O device. Device driver 320 then performs I/O reads (RD) and I/O writes (WR) to set up the device. Then, device driver 320 requests an amount of memory, such as 8 kB, from operating system (O/S) 330 to be "pinned" so device driver 320 can read and write into physical memory. O/S 330 then communicates with the central processing unit (CPU) virtual memory manager (VMM) 340 to deallocate the requested amount of memory. The CPU VMM 340 assigns an effective address range to the I/O VMM 345, and the CPU VMM 340 and I/O VMM 345 perform a page out operation 350 to pin the memory to the I/O device.

This typical process is based on a model that has existed for a very long time. Processes running on processors are at the top of the hierarchy, while I/O devices are at the bottom of the hierarchy. Manufacturers of I/O devices accept that I/O devices are second-class citizens, and that a process must go through the conventional process of setting up an I/O device through an O/S library and a device driver to perform I/O reads and writes.

As current trends continue, network I/O and storage I/O in particular are becoming more important than the processing elements. Yet, the model for setting up an I/O device and performing I/O reads and writes remains the same. The existing model is the pervasive world, and manufacturers are left to accept their lot in life.

SUMMARY

In one illustrative embodiment, a method, in a data processing system, for virtualization of resources comprises receiving a request to access data from an application. The request to access data specifies a target Internet protocol address. A virtual address space of the data processing system is expanded to include Internet protocol addresses. The method comprises translating the target Internet protocol address to a real address using a page frame table. The page frame table is expanded to include entries for Internet protocol addresses. The method further comprises performing a data access operation based on the real address.

In another illustrative embodiment, a data processing system comprises a processor and a memory coupled to the processor. The memory comprises instructions which, when executed by the processor, cause the processor to receive a request to access data from an application. The request to access data specifies a target Internet protocol address. A virtual address space of the data processing system is expanded to include Internet protocol addresses. The instructions further cause the processor to translate the target Internet protocol address to a real address using a page frame table. The page frame table is expanded to include entries for Internet protocol addresses. The instructions further cause the processor to perform a data access operation based on the real address.

In another illustrative embodiment, a computer program product comprises a computer useable medium having a computer readable program. The computer readable program, when executed on a computing device, causes the computing device to receive a request to access data from an application, wherein the request to access data specifies a target Internet protocol address. A virtual address space of the data processing system is expanded to include Internet protocol addresses. The computer readable program causes the computing device to translate the target Internet protocol address to a real address using a page frame table. The page frame table is expanded to include entries for Internet protocol addresses. The computer readable program further causes the computing device to perform a data access operation based on the real address.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
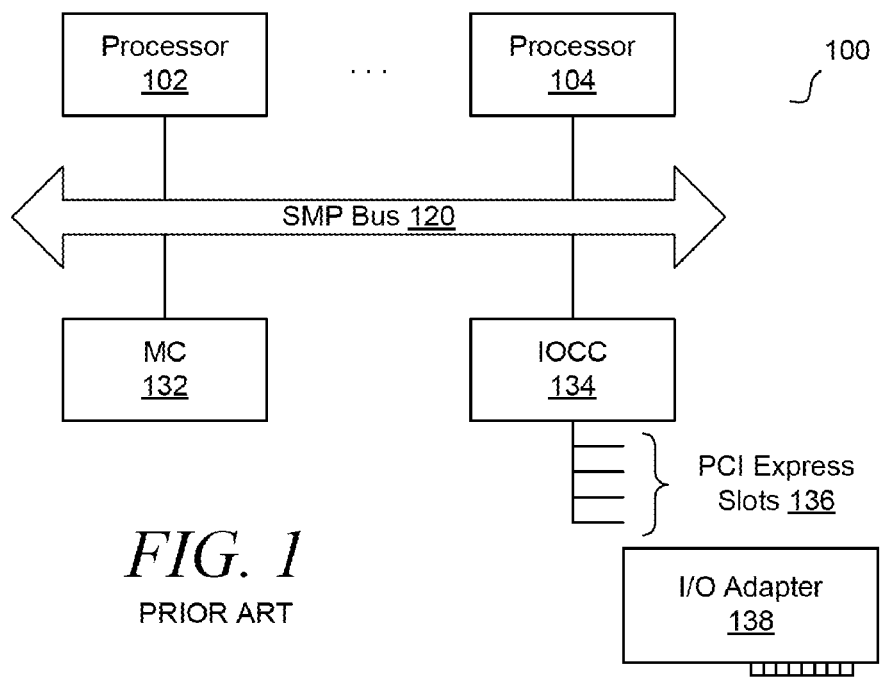
FIG. 1 is a block diagram illustrating a typical multiple processor data processing system.
Figure 2:
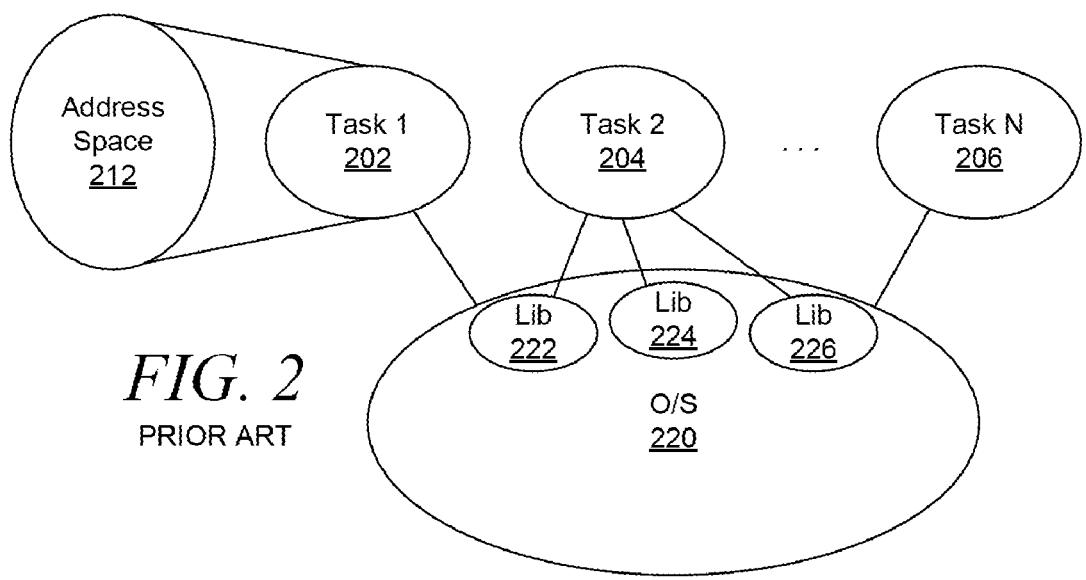
FIG. 2 illustrates a typical software environment for a data processing system.
Figure 3:
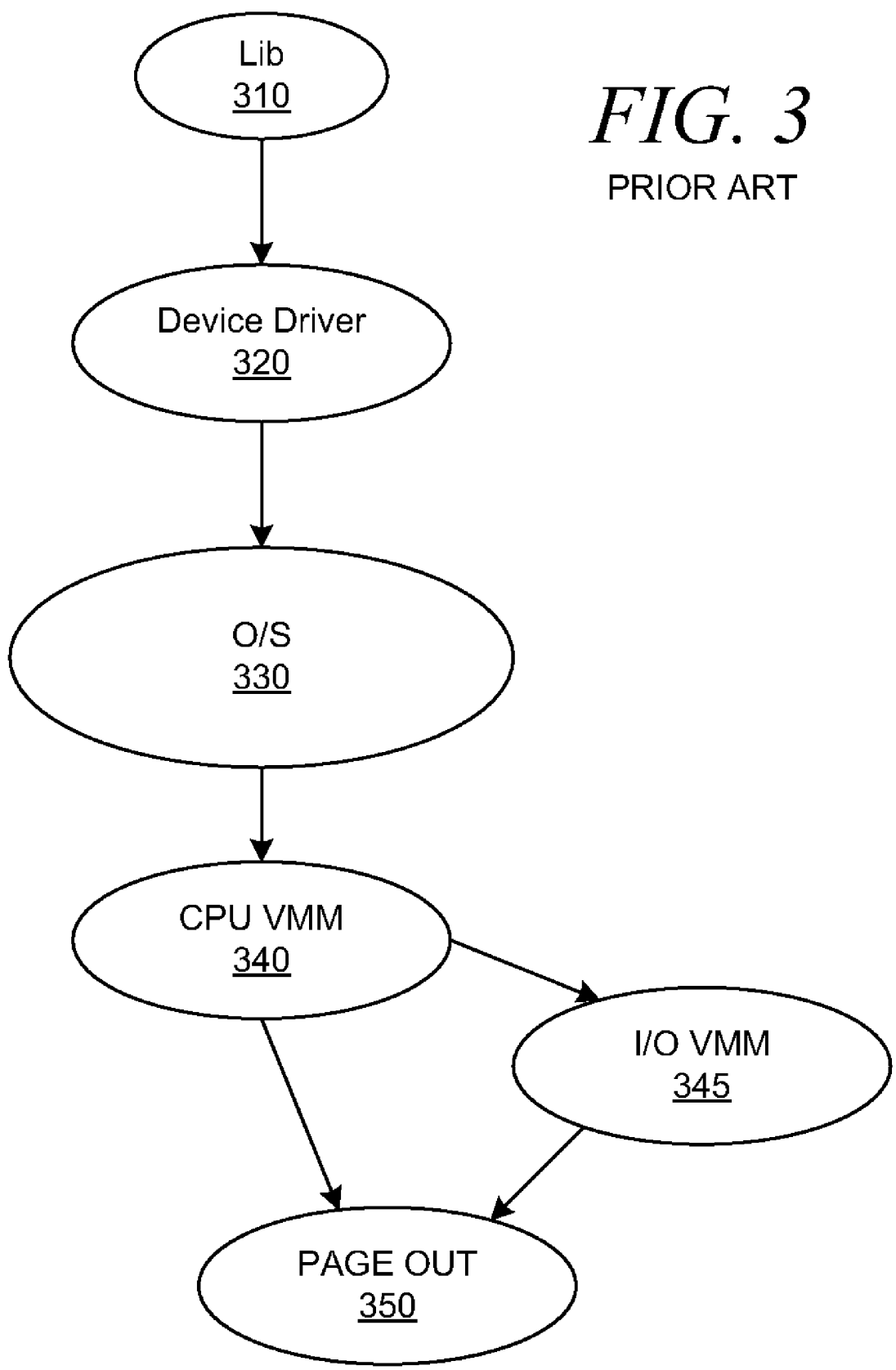
FIG. 3 illustrates a typical input/output access.
Figure 4:
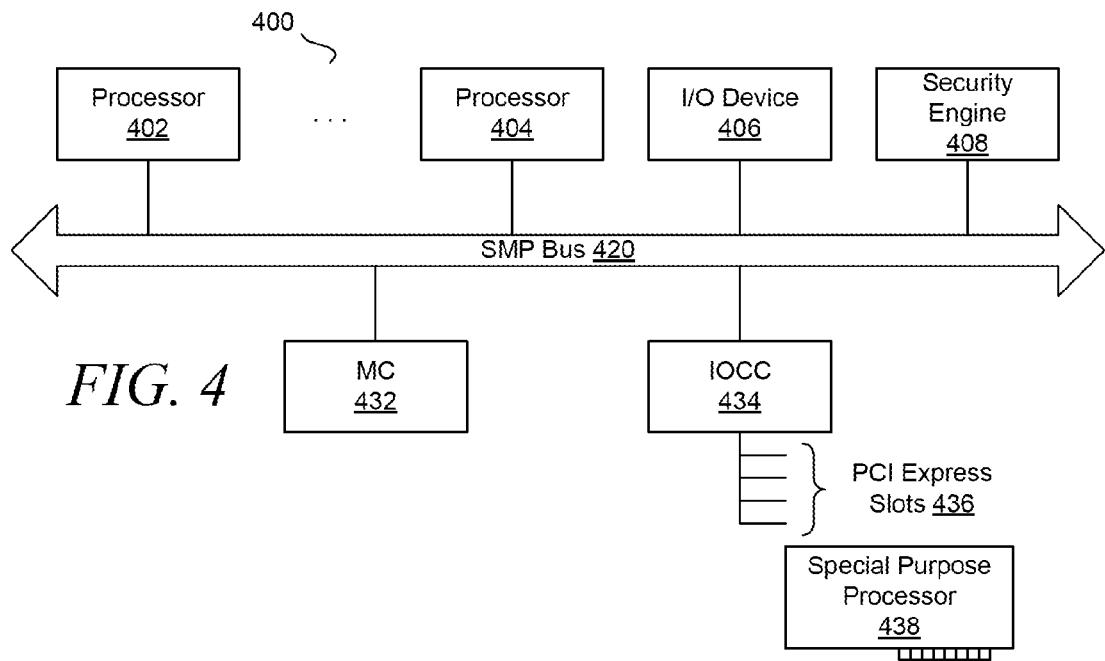
FIG. 4 is a block diagram of an exemplary data processing system in which aspects of the illustrative embodiments may be implemented.

With reference now to the figures and in particular with reference to FIG. 4, an exemplary diagram of data processing environments is provided in which illustrative embodiments of the present invention may be implemented. It should be appreciated that FIG. 4 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 4, a block diagram of an exemplary data processing system is shown in which aspects of the illustrative embodiments may be implemented. Data processing system 400 is an example of a computer. In the depicted example, data processing system 400 has a plurality of processors 402, 404 connected via a symmetric multiprocessing (SMP) bus 420. Memory controller (MC) 432 and input/output channel controller (IOCC) 434 also connect to SMP bus 420.

An operating system may run on processing units 402, 404. The operating system coordinates and provides control of various components within the data processing system 400 in FIG. 4. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 400 (Java is a trademark of Sun Microsystems, Inc. in the United States, other countries, or both).

As a server, data processing system 400 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 400 may be a symmetric multiprocessor (SMP) system including a plurality of processors in processing units 402, 404. Alternatively, a single processor system may be employed.

Instructions for the operating system, the object-oriented programming system, and applications or programs are located on storage devices, such as a hard disk drive, and may be loaded into main memory through memory controller 432 for execution by processing units 402, 404. The processes for illustrative embodiments of the present invention may be performed by processing units 402, 404 using computer usable program code, which may be located in a memory such as main memory (not shown), or in one or more peripheral devices, for example.

A bus system, such as SMP bus 420 as shown in FIG. 4, may be comprised of one or more buses. Of course, the bus system may be implemented using any type of communication fabric or architecture that provides for a transfer of data between different components or devices attached to the fabric or architecture. Those of ordinary skill in the art will appreciate that the hardware in FIG. 4 may vary depending on the implementation. Other internal hardware or peripheral devices, such as flash memory, equivalent non-volatile memory, or optical disk drives and the like, may be used in addition to or in place of the hardware depicted in FIG. 4.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device which is configured with flash memory to provide non-volatile memory for storing operating system files and/or user-generated data, for example. Essentially, data processing system 400 may be any known or later developed data processing system without architectural limitation.

In a typical software environment, a plurality of tasks runs under control of an operating system. A task may be a process running on a processor, such as a user level thread, for example. Each task has an assigned address space. Each task has an address space, or address spaces, from which and to which it may read and write. The operating system translates the effective addresses to real addresses, which may exist in memory or may be expanded to persistent storage using a virtual memory manager. A user level, thread communicates with another user level thread by making an access request to an effective address.

Each time a task attempts to access an I/O device, the task must make a call to a library, which accesses the device driver for the target I/O device. The device driver then performs I/O reads and writes to set up the device. Then, the device driver requests an amount of memory, such as 8 kB, from the operating system to be "pinned" so the device can read and write into physical memory. This typical process is based on a model that has existed for a very long time. Processes running on processors are at the top of the hierarchy, while I/O devices are at the bottom of the hierarchy. Manufacturers of I/O devices accept that I/O devices are second-class citizens, and that a process must go through the conventional process of setting up an I/O device through an O/S library and a device driver to perform I/O reads and writes. As current trends continue, network I/O and storage I/O in particular are becoming more important than the processing elements. Yet, the model for setting up an I/O device and performing I/O reads and writes remains the same. The existing model is the pervasive world, and manufacturers are left to accept their lot in life.

In accordance with an illustrative embodiment, a heterogeneous processing element model is provided where I/O devices look and act like processors. In order to be treated like a processor, an I/O processing element, or other special purpose processing element, must follow some rules and have some characteristics of a processor, such as address translation, security, interrupt handling, and exception processing, for example. The heterogeneous processing element model puts special purpose processing elements on the same playing field as processors, from a programming perspective, operating system perspective, power perspective, as the processors. The operating system can get work to a security engine, for example, in the same way it does to a processor.

In the illustrative embodiment, IOCC 434 connects to a plurality of expansion slots, such as peripheral component interconnect express (PCI Express or PCIe) slots 436. One or more special purpose processors 438 may connect to PCI Express slots 436. In the depicted example, special purpose processor 438 may be, for example, an I/O device, such as a local area network (LAN) adapter, a storage controller, a security engine, or the like. Thus, a heterogeneous processing element model is provided where I/O devices and other special purpose processing elements look and act like processors. In order to be treated like a processor, a special purpose processing element must follow some rules and have some characteristics of a processor, such as address translation, security, interrupt handling, and exception processing, for example.

Alternatively, in accordance with the illustrative embodiment, a special purpose processing element may connect to SMP bus 120 via a processor slot (not shown). Thus, I/O device 406 and security engine 408, for example, may look and act like a processor to the operating system, as long as I/O device 406 and security engine 408 obey the rules of a processor. The heterogeneous processing element model puts special purpose processing elements, such as I/O device 406, security engine 408, and special purpose processor 438, on the same playing field as processors, from a programming perspective, operating system perspective, power perspective, as the processors. The operating system can get work to a security engine, for example, in the same way it does to a processor.

This heterogeneous processing element model eliminates the need for a device driver for I/O devices, for instance. Each processing element is assigned an address space from which and to which it may read and write. The operating system may then bind a process to a processing element, whether the processing element is a conventional single core processor, a multiple core processor, an I/O adapter, a security engine, or some other type of processing element. Some processing elements will be better at certain types of work than others. For example, a security engine will be better at a cryptography task than a conventional processor.

Figure 5:
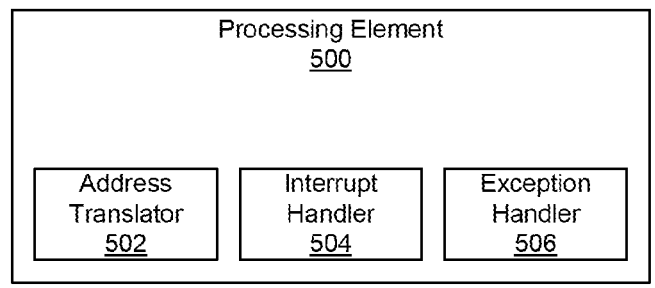
FIG. 5 is a block diagram of a processing element in accordance with an illustrative embodiment.

FIG. 5 is a block diagram of a processing element in accordance with an illustrative embodiment. As stated above, in order to be treated like a processor, a processing element must behave like a processor, meaning it must follow some rules and have some characteristics of a processor, such as address translation, security, interrupt handling, and exception processing, for example. Processing element 500 may be, for example, an I/O device, a security engine, a graphics processor, etc. Processing element 500 includes an address translator 502 to translate between effective addresses and real addresses.

In one exemplary embodiment, address translator 502 may be an effective-to-real address translation (ERAT) table. Known processor architectures specify a translation-lookaside buffer (TLB) and a segment-lookaside buffer (SLB) to translate from the effective address (EA) used by software and the real address (RA) used by hardware to locate instructions and data in storage. Since these translation mechanisms take several cycles, once translated, the EA, RA pair is stored in a two-way set-associative array, called the effective-to-real address translation (ERAT) table. For example, the POWER4™ architecture from IBM Corporation implements separate ERATs for instruction-cache (IERAT) and data-cache (DERAT) accesses. Both ERATs are indexed using the effective address. A common 1024-entry four-way set-associative TLB is implemented for each processor. Thus, in the exemplary embodiment, address translator 502 of processing element 500 may be a similar ERAT table to allow the processing element to easily translate between the effective address used by software and the real address used by hardware.

Processing element 500 also includes an interrupt handler 504. An interrupt is a signal that gets the attention of a processor and is usually generated when I/O is required. For example, hardware interrupts are generated when a key is pressed or when the mouse is moved. Software interrupts are generated by a program requiring disk input or output. As another example, an internal timer may continually interrupt the computer several times per second to keep the time of day current or for timesharing purposes. When an interrupt occurs, processing element 500 transfers control to the operating system, which determines the action to be taken. Thus, in order to be treated like a processor, a special purpose processing element, such as processing element 500, must have an interrupt handler 504 to take appropriate action when hardware or software requires the attention of processing element 500.

Processing element 500 also includes exception handler 506. Exception handling is a programming language construct or computer hardware mechanism designed to handle the occurrence of some condition that changes the normal flow of execution. The condition is called an exception. Exceptions are normally recommended to be used only for signaling error (exceptional) conditions. In general, current state will be saved in a predefined location and execution will switch to a predefined handler. Depending on the situation, the handler may later resume the execution at the original location, using the saved information to restore the original state. For example, an exception that will usually be resumed is a page fault, while a division by zero usually cannot be resolved transparently. From the processing point of view, hardware interrupts are similar to resumable exceptions, although they are usually not related to the current program flow. Thus, processing element 500 includes exception handler 506 to manage exception conditions that may change the normal flow of execution.

Thus, processing element 500 includes the necessary characteristics in order to be treated by a processor with respect to the operating environment of the data processing system. Whether processing element 500 exists in an expansion slot, such as PCI Express slots 436 in FIG. 4, or a processor slot, processing element 500 is treated like a processor by the operating system. In addition, processing element 500 must obey certain rules that processors must obey, particularly rules about security, for example. The operating system may then assign an address space from which and to which processing element 500 may read and write. The operating system may bind a process to processing element 500. Furthermore, other tasks may touch I/O, for instance, without the need for libraries and device drivers.

Figure 6:
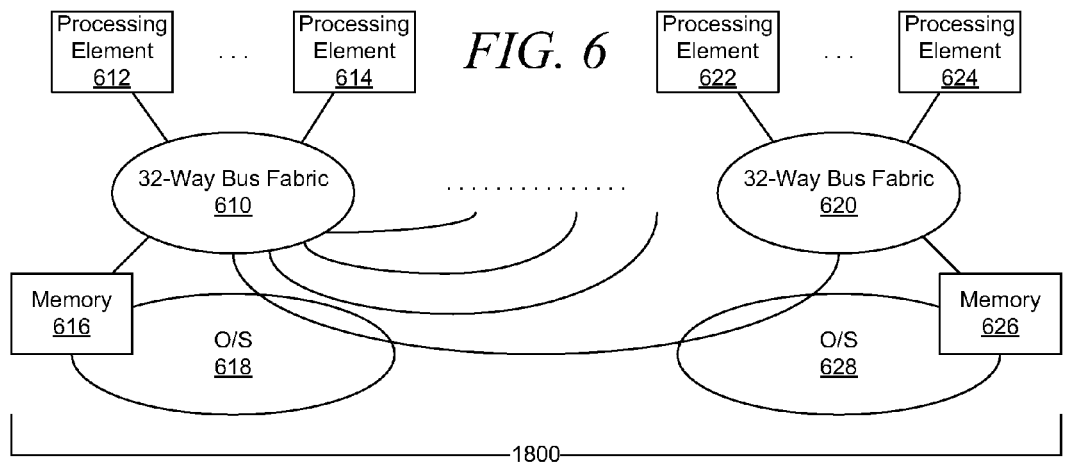
FIG. 6 is a diagram of a multi-tiered interconnect with a heterogeneous processing element model in accordance with an illustrative embodiment.

FIG. 6 is a diagram of a multi-tiered interconnect with a heterogeneous processing element model in accordance with an illustrative embodiment. A 32-way bus fabric 610 connects up to 32 processing elements 612-614 and memory 616. An operating system 618 runs on processing elements 612-614, assigns effective address ranges to processing elements 612-614, and may bind processes to processing elements 612-614.

In the depicted example, 32-way bus fabric 610 may be connected to up to 1800 such 32-way bus fabrics, such as 32-way bus fabric 620. The 32-way bus fabric 620 connects up to 32 processing elements 622-624 and memory 626. Operating system 628 runs on processing elements 622-624, assigns effective address ranges to processing elements 622-624, and may bind processes to processing elements 622-624. Thus, in the multi-tiered interconnect in the illustrative embodiment, there may be as many as 57,600 processing elements. The multi-tiered interconnect depicted in FIG. 6 is meant to illustrate an example and is not meant to imply architectural limitation. More or fewer tiers or processing elements may be permitted depending upon the implementation.

Each one of processing elements 612-614 and 622-624 may be a conventional processor or a special purpose processing element. For example, processing element 612 may be a conventional processor while processing element 624 may be an I/O device. Thus, in accordance with an illustrative embodiment, an I/O device, such as processing element 624, for example, may be abstracted from the physical proximity of processing element 612, for example. That is, an I/O device may simply be addressed, even over a distance, rather than having to make a call to a library, call a device driver, pin memory, and so forth.

Figure 7:
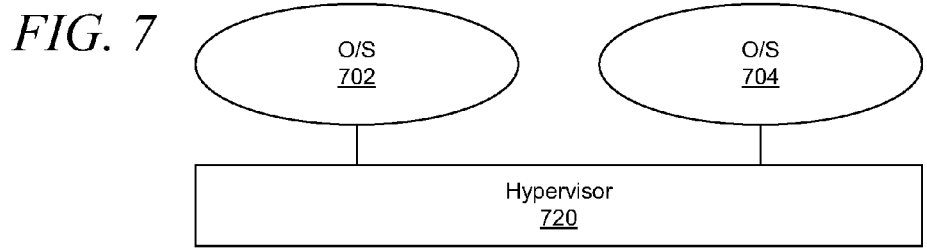
FIG. 7 illustrates abstraction of I/O devices through a hypervisor in accordance with an illustrative embodiment.

FIG. 7 illustrates abstraction of I/O devices through a hypervisor in accordance with an illustrative embodiment. Operating system 702 may make a call to hypervisor 720, which may be addressed to a process running on operating system 704. Hypervisor 720 is a virtualization platform, which may be hardware, software, or a combination of hardware and software. Hypervisor 720 allows multiple operating systems 702, 704 to run on the same data processing system at the same time. Because hypervisor 720 virtualizes, or abstracts, resources within the data processing system, operating system 702 may make calls to operating system 704, but could just as easily make calls to a wide area network (WAN) (not shown).

In accordance with an illustrative embodiment, the heterogeneous processing element model abstracts an I/O device such that communication intended for the I/O device may be packetized and sent over a network. A packet is a formatted block of data carried by a packet mode computer network. Computer communications links that do not support packets, such as traditional point-to-point telecommunications links, simply transmit data as a series of bytes, characters, or bits alone. When data is formatted into a packet, the network can transmit long messages more efficiently and reliably. As an example, transmission control protocol/Internet protocol (TCP/IP) is a suite of network transmission protocol that uses packets.

In accordance with an illustrative embodiment, an addressing model is provided where devices, including I/O devices, are addressed with internet protocol (IP) addresses, which are considered part of the virtual address space. A task, such as an application, may be assigned an effective address range, which corresponds to addresses in the virtual address space. The virtual address space is expanded to include Internet protocol addresses. Thus, the page frame tables are also modified to include entries for IP addresses and additional properties for devices and I/O. A processing element, such as an I/O adapter or even a printer, for example, may also be addressed using IP addresses without the need for library calls, device drivers, pinning memory, and so forth. This addressing model also provides full virtualization of resources across an IP interconnect, allowing a process to access an I/O device across a network.

Figure 8:
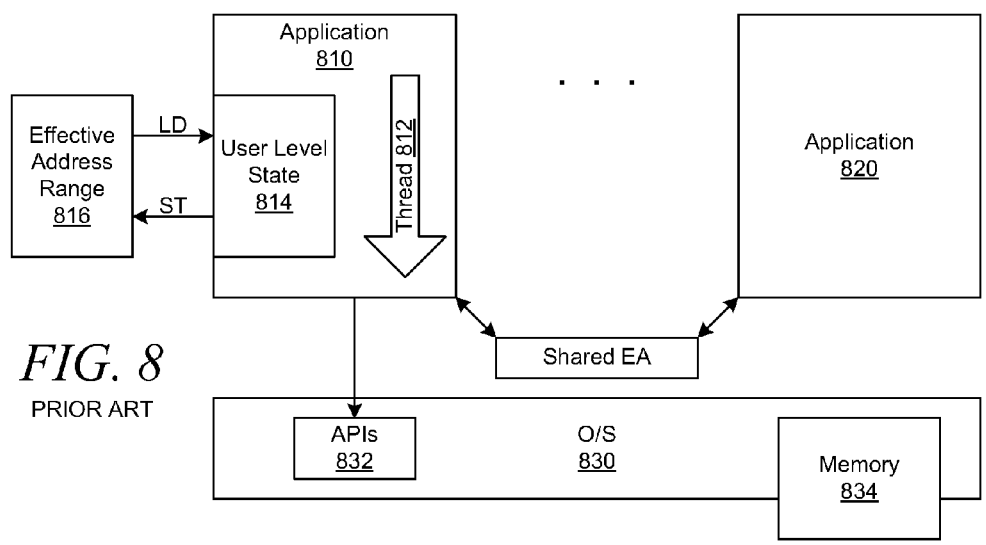
FIG. 8 is a block diagram illustrating a typical addressing model.

FIG. 8 is a block diagram illustrating a typical addressing model. Operating system 830 initiates applications 810, 820. Operating system 830 assigns an effective address range 816 to application 810, which comprises thread 812. Effective address range 816 corresponds to a private portion of memory 834 for application 810. As instructions in thread 812 execute, application 810 may make loads and stores to the effective address range 816. These loads and stores may be to or from general purpose register (GPR), floating point register (FPR), control registers (CRs), etc., which make up user level state 814.

Application 810 may also make calls to application programming interfaces (APIs) 832. Application 810 may also access a shared portion of memory 834, which is shared between application 810 and application 820, using a shared effective address.

In the prior art model, everything within the scope of the data processing system may be addressed using effective addresses, or virtual addresses in some environments, and to access a device or data outside the data processing system would require calls to libraries and device drivers, pinning memory, etc. In accordance with the illustrative embodiment, the virtual address space is expanded to include Internet protocol addresses. Thus, the page frame tables are also modified to include entries for IP addresses and additional properties for devices and I/O. A processing element, such as an I/O adapter or even a printer, for example, may also be addressed using IP addresses without the need for library calls, device drivers, pinning memory, and so forth.

Figure 9:
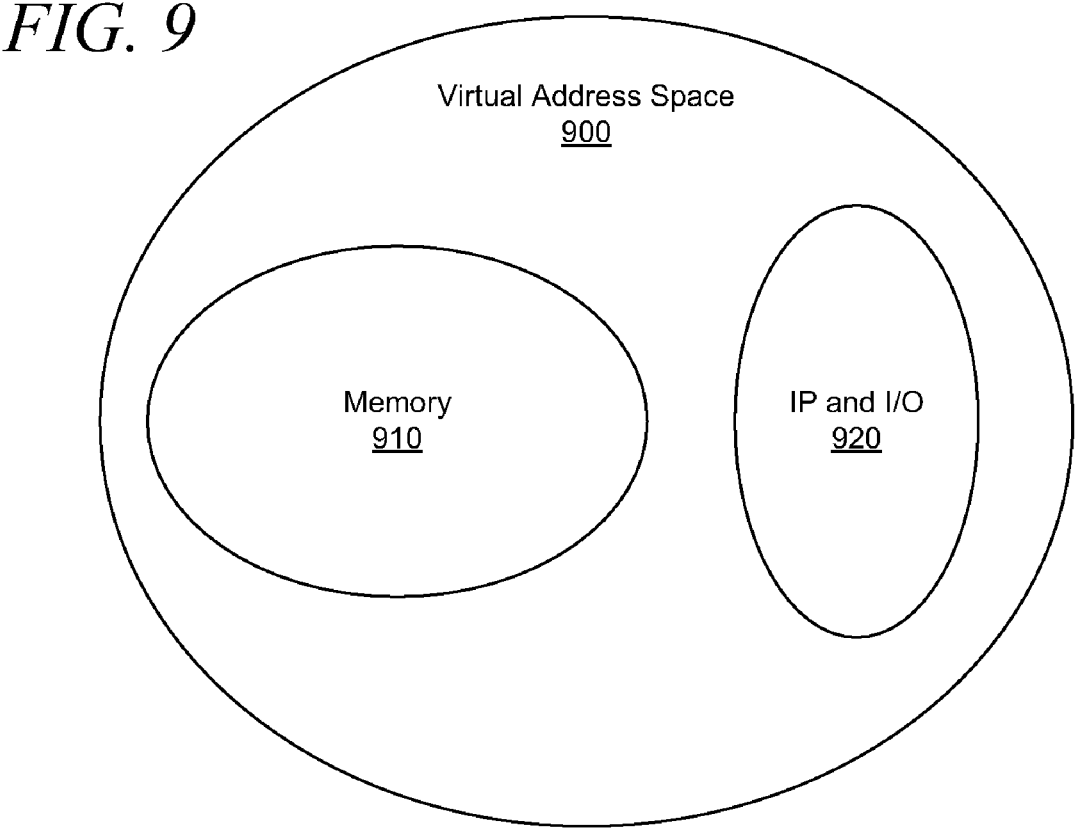
FIG. 9 illustrates a virtual address space for an addressing model for full virtualization of resources across an IP interconnect in accordance with an illustrative embodiment.

FIG. 9 illustrates a virtual address space for an addressing model for full virtualization of resources across an IP interconnect in accordance with an illustrative embodiment. Virtual address space 900 represents the virtual addresses that are known to a data processing system. Portions of virtual address space 900, such as memory portion 910, are used for memory. That is, virtual addresses in portion 910 are for private or shared memory within the data processing system, or perhaps even memory that may be borrowed from another blade, for example.

In accordance with the illustrative embodiment, virtual address space 900 is expanded to include IP and I/O portion 920 that may include IP addresses for devices. Therefore, virtual addresses, or effective addresses, may be used to address memory within the data processing system, and devices are still virtualized to IP addresses.

Figure 10:
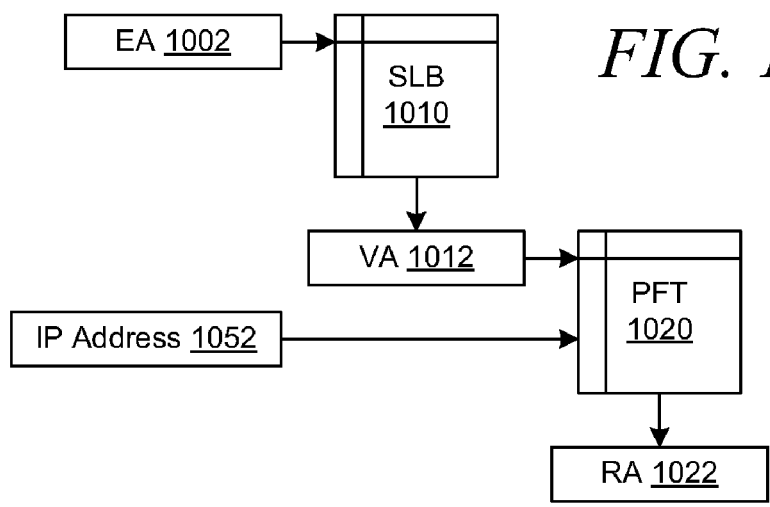
FIG. 10 illustrates address translation for full virtualization of resources across an IP interconnect in accordance with an illustrative embodiment.

FIG. 10 illustrates address translation for full virtualization of resources across an IP interconnect in accordance with an illustrative embodiment. An effective address (EA) 1002 may be given for a data access, such as a load or a store operation. Segment lookaside buffer (SLB) 1010 translates effective address 1002 to virtual address (VA) 1012. The SLB 1010 is set up by the operating system. Page frame table 1020 then translates virtual address 1012 to real address (RA) 1022, for addresses that are in the physical domain of the data processing system, the memory.

Page frame table (PFT) 1020 is expanded to include entries for Internet protocol (IP) addresses for devices and I/O. An IP address 1052 may be given for a device or I/O operation. PFT 1020 may translate IP address 1052 to a real address 1022. A real address to physical address table (not shown) may also translate the real address to a physical address of a device.

Figure 11:
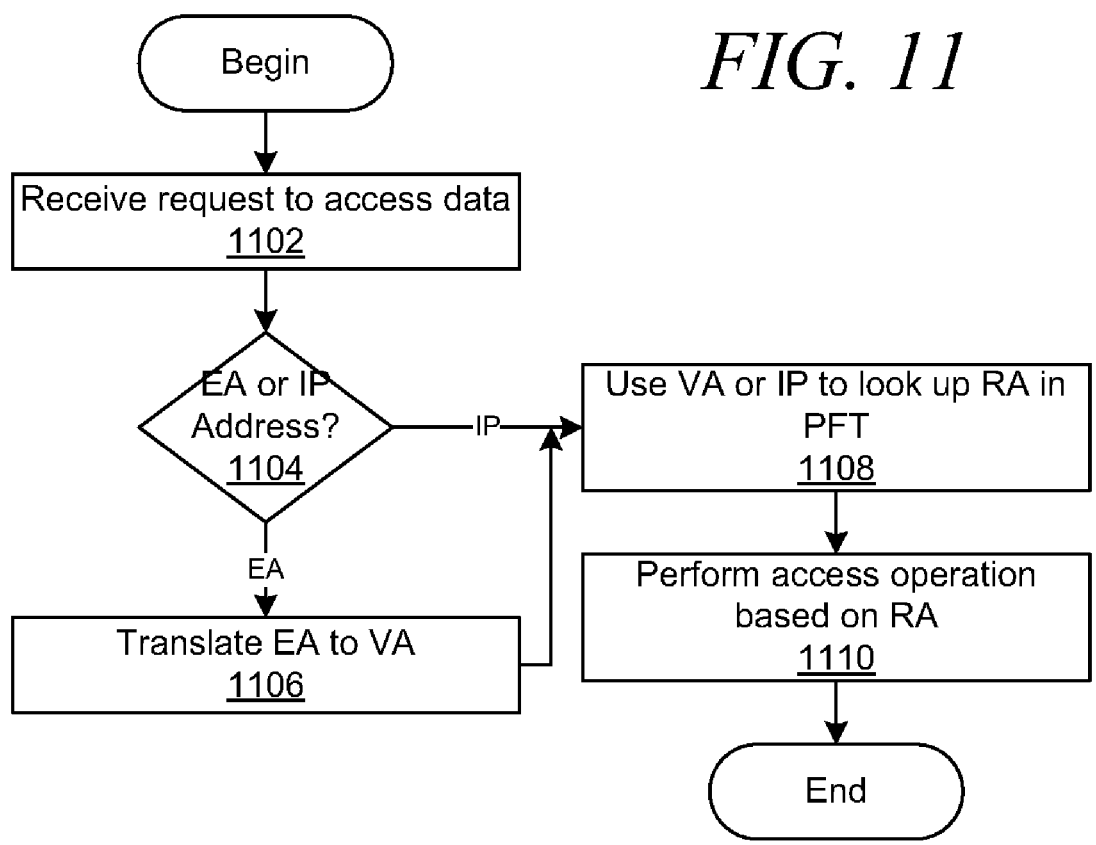
FIG. 11 is a flowchart that illustrates operation of addressing with full virtualization of resources across an IP interconnect using the page frame table in accordance with an illustrative embodiment.

FIG. 11 is a flowchart that illustrates operation of addressing with full virtualization of resources across an IP interconnect using the page frame table in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference now to FIG. 11, operation begins, and the operating system receives a request from an application to access data (block 1102). The operating system determines whether the address of the request is an effective address (EA) or an Internet protocol (IP) address (block 1104). If the address is an effective address, the segment lookaside buffer (SLB) translates the effective address to a virtual address (VA) (block 1106).

Thereafter, or if the address is an IP address in block 1104, the operating system uses the virtual address or IP address to look up the real address (RA) in the PFT (block 1108). Then, the application performs the access operation based on the real address (block 1110), and operation ends. In an alternative embodiment, the operating system may use a real address to physical address table to translate the RA to a physical address of the device.

Thus, the illustrative embodiments solve the disadvantages of the prior art by providing a heterogeneous processing element model where I/O devices look and act like processors. In order to be treated like a processor, an I/O processing element, or other special purpose processing element, must follow some rules and have some characteristics of a processor, such as address translation, security, interrupt handling, and exception processing, for example. The heterogeneous processing element model puts special purpose processing elements on the same playing field as processors, from a programming perspective, operating system perspective, power perspective, as the processors. The operating system can get work to a security engine, for example, in the same way it does to a processor. The heterogeneous processing element model abstracts an I/O device such that communication intended for the I/O device may be packetized and sent over a network. Thus, communication intended for a remotely located I/O device may be packetized and transmitted over a distance, rather than having to make a call to a library, call a device driver, pin memory, and so forth.

An addressing model is provided where devices, including I/O devices, are addressed with internet protocol (IP) addresses, which are considered part of the virtual address space. A task, such as an application, may be assigned an effective address range, which corresponds to addresses in the virtual address space. The virtual address space is expanded to include Internet protocol addresses. Thus, the page frame tables are also modified to include entries for IP addresses and additional properties for devices and I/O. Thus, a processing element, such as an I/O adapter or even a printer, for example, may also be addressed using IP addresses without the need for library calls, device drivers, pinning memory, and so forth. This addressing model also provides full virtualization of resources across an IP interconnect, allowing a process to access an I/O device across a network.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for virtualization of resources, the method comprising:
   receiving, by an operating system of the data processing system, a request to access data from an application, wherein the request to access data specifies a target Internet protocol address, wherein a virtual address space of the data processing system is expanded to include Internet protocol addresses;
   translating, by the operating system, the target Internet protocol address to a real address using a page frame table, wherein the page frame table is expanded to include entries for Internet protocol addresses; and
   performing a data access operation based on the real address.

2. The method of claim 1, further comprising:
   receiving a subsequent request to access data from the application, wherein the subsequent request to access data specifies an effective address;
   translating the effective address to a virtual address using a segment lookaside buffer; and
   translating the virtual address to a real address using the page frame table.

3. The method of claim 2, wherein the subsequent request to access data is a load operation to load a data value to a user level state register.

4. The method of claim 2, wherein the subsequent request to access data is a store operation to store a data value from a user level state register.

5. The method of claim 2, further comprising:
   translating the real address to a physical address using a real to physical address table; and
   performing the data access operation based on the physical address.

6. The method of claim 1, further comprising:
   receiving a subsequent request to access data from the application, wherein the subsequent request to access data specifies a virtual address; and
   translating the virtual address to a real address using the page frame table.

7. The method of claim 6, further comprising:
   translating the real address to a physical address using a real to physical address table; and
   performing the data access operation based on the physical address.

8. The method of claim 1, wherein the request to access data is a request to access a device.

9. A data processing system, comprising:
   a processor; and
   a memory coupled to the processor, the memory comprising instructions which, when executed by the processor, cause the processor to:
   receive, by an operating system of the data processing system, a request to access data from an application, wherein the request to access data specifies a target Internet protocol address, wherein a virtual address space of the data processing system is expanded to include Internet protocol addresses;
   translate, by the operating system, the target Internet protocol address to a real address using a page frame table, wherein the page frame table is expanded to include entries for Internet protocol addresses; and
   perform a data access operation based on the real address.

10. The data processing system of claim 9, wherein the instructions further cause the processor to:
    receive a subsequent request to access data from the application, wherein the subsequent request to access data specifies an effective address;
    translate the effective address to a virtual address using a segment lookaside buffer; and
    translate the virtual address to a real address using the page frame table.

11. The data processing system of claim 10, wherein the subsequent request to access data is a load operation to load a data value to a user level state register.

12. The data processing system of claim 10, wherein the subsequent request to access data is a store operation to store a data value from a user level state register.

13. The data processing system of claim 9, wherein the instructions further cause the processor to:
    receive a subsequent request to access data from the application, wherein the subsequent request to access data specifies a virtual address; and
    translate the virtual address to a real address using the page frame table.

14. The data processing system of claim 9, wherein the request to access data is a request to access a device.

15. A computer program product comprising a computer useable storage medium having a computer readable program, wherein the computer readable program, when executed on a computing device, causes the computing device to:
    receive, by an operating system of the data processing system, a request to access data from an application, wherein the request to access data specifies a target Internet protocol address, wherein a virtual address space of the data processing system is expanded to include Internet protocol addresses;
    translate, by the operating system, the target Internet protocol address to a real address using a page frame table, wherein the page frame table is expanded to include entries for Internet protocol addresses; and
    perform a data access operation based on the real address.

16. The computer program product of claim 15, wherein the computer readable program further causes the computing device to:
    receive a subsequent request to access data from the application, wherein the subsequent request to access data specifies an effective address;
    translate the effective address to a virtual address using a segment lookaside buffer; and
    translate the virtual address to a real address using the page frame table.

17. The computer program product of claim 16, wherein the subsequent request to access data is a load operation to load a data value to a user level state register.

18. The computer program product of claim 16, wherein the subsequent request to access data is a store operation to store a data value from a user level state register.

19. The computer program product of claim 15, wherein the computer readable program further causes the computing device to:

receive a subsequent request to access data from the application, wherein the subsequent request to access data specifies a virtual address; and translate the virtual address to a real address using the page frame table.

20. The computer program product of claim 15, wherein the request to access data is a request to access a device.

* * * * *